March 5, 1935.  R. R. COLGATE  1,993,261
WHEELING PLATE
Filed June 26, 1934
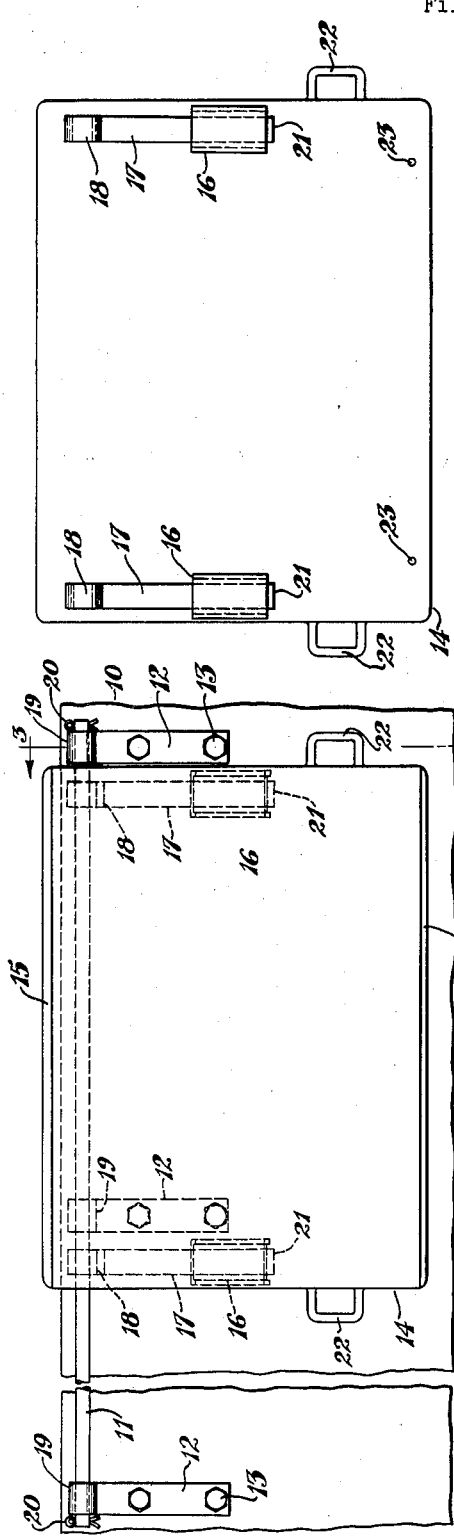
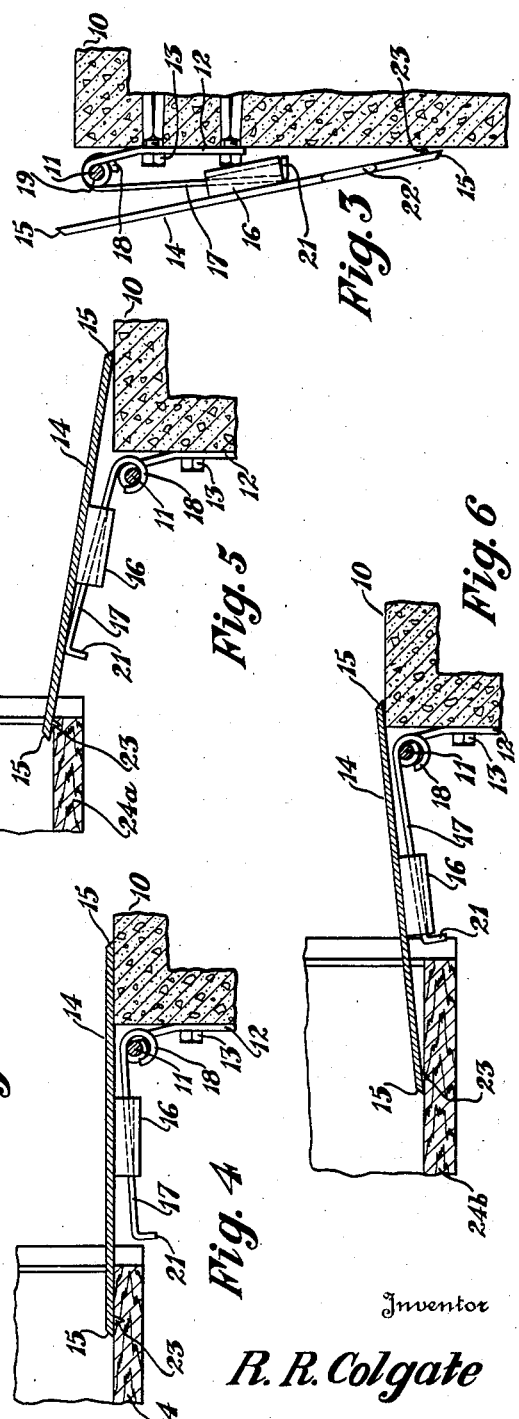
Inventor
R. R. Colgate
By Frease and Bishop
Attorneys Patented Mar. 5, 1935

1,993,261

UNITED STATES PATENT OFFICE 1,993,261

WHEELING PLATE

Richard R. Colgate, Alliance, Ohio

Application June 26, 1934, Serial No. 732,412

6 Claims. (Cl. 14—71)

The invention relates to wheeling plates or loading skids adapted to bridge the gap between a loading or unloading platform and the floor of a freight car so that articles of freight may be wheeled, trucked or carried from the platform to the car or vice versa.

Ordinarily this is accomplished by means of a heavy steel plate which is allowed to remain upon the platform when not in use and which must be manually lifted into position across the gap between the platform and car and spiked in position when it is desired to load or unload a car.

In order to withstand the loads wheeled or carried over the same, these plates must necessarily be of considerable thickness and are therefore quite heavy and difficult to manually place in position for use or to remove and place upon the platform when not in use and workmen are frequently injured in handling the ordinary plates. Furthermore, as these plates are of considerable thickness, they are frequently the cause of injury to persons stumbling over the edges thereof when walking along the platform on which the plates are placed when not in use.

The object of the present improvement is to provide a wheeling plate or loading skid which may be easily placed in position between a loading platform and freight car or removed from operative position without danger of injury to the workmen handling the same.

Another object is to provide a plate of this character which is arranged to hang suspended in vertical position along the side of the platform when not in use, so as not to form an obstruction over which persons may stumble.

A further object is to provide such a plate with means for holding it rigidly in operative position without requiring the same to be spiked down when in use.

A still further object of the improvement is to provide a wheeling plate which is slidably mounted alongside of the platform so that it may be quickly and easily moved to the desired position to register with the door of a freight car.

A further object is to provide a wheeling plate which is adjustable laterally and to some extent vertically so that it may be easily positioned across the gap between the loading platform and a freight car either of the same height as the platform or a lower or higher car.

The above objects, together with others which will be apparent from the accompanying drawing and the following description, or which may be hereinafter pointed out, may be attained by constructing the improved wheeling plate in the manner illustrated in the accompanying drawing, in which Figure 1 is a front elevation of the improved wheeling plate showing it hanging along the side of a loading platform in the inoperative position;

Fig. 2, a bottom plan view of the improved loading plate;

Fig. 3, a section taken as on the line 3—3, Fig. 1;

Fig. 4, a transverse section through the wheeling plate showing portions of a loading platform and freight car with the wheeling plate in operative position;

Fig. 5, a view similar to Fig. 4, showing the wheeling plate in position between the platform and a car higher than the platform; and Fig. 6, a similar view showing the plate in position between the platform and a car lower than the platform.

Similar numerals refer to similar parts throughout the drawing.

A portion of a loading or unloading platform formed of concrete or the like is indicated generally at 10. The improved wheeling plate is arranged to be adjustably mounted upon a substantially horizontal bar or rod 11 located along one side of the platform spaced slightly therefrom and below the top of the platform, this bar or rod being mounted upon the side of the platform adjacent to the track upon which railroad cars are moved alongside of the platform, as by the brackets 12 which may be connected to the platform as by bolts 13. It should be understood, of course, that although a concrete platform is illustrated, this is merely for the purpose of showing the application of the invention to a platform which may be built of wood, metal or other suitable material.

The improved wheeling plate to which the invention pertains may be a substantially rectangular plate of sufficient size and thickness to accomplish the purpose, as indicated generally at 14, and the opposite side edges thereof may be beveled as at 15 to permit a wheelbarrow or truck to ride easily over the same.

Channel guides 16 are fixed to the underside of the plate 14 near each end thereof at about the median line, as by spot welding or the like and the supporting bars 17 are slidably located therethrough, these bars being provided at their upper ends with loops or hooks 18 slidably mounted upon the rod or bar 11 and so arranged that the plate may be moved longitudinally upon said bar between the eyes 19 at the upper ends of the brackets 12. In order to prevent accidental displacement of the bar 11, cotter pins 20 or the like may be provided in the ends thereof.

Angular stop flanges or hooks 21 may be formed upon the lower or free ends of the supporting bars 17 for engagement with the adjacent ends of the channel guides 16 to hold the plate 14 suspended in substantially upright position alongside of the loading platform, as indicated in Figs. 1 and 3.

A handle 22 may be fixed to each end of the plate 14 near the free edge thereof so that the plate may be swung into position by the workmen inserting hooks in said handles. Sharpened studs or spikes 23 are preferably formed upon the underside of the plate and adapted to be imbedded into the floor of a freight car to hold the plate in adjusted position when it is mounted for use between the platform and a car.

When it is desired to position the wheeling plate between the platform and the floor of a freight car such as shown in fragment at 24 in Fig. 4, the plate 14 is raised as by hooks or the like inserted into the handles 22 to such height that it may be swung upward so as to clear the side of the freight car and is then slid forward until a substantial portion of the free edge thereof is located over the floor 24 of the freight car.

The sharpened studs 23 may become imbedded in the floor of the freight car as shown in Fig. 4 by the weight of the first load going over the wheeling plate or these studs may be driven into the floor of the car by means of a hammer or the like positioning the wheeling plate 14 rigidly in place across the gap between the loading platform and freight car, as shown in Fig. 4.

In the event the floor 24a of the freight car is higher than the top of the platform, the wheeling plate may be positioned as shown in Fig. 5, the free edge of the plate being located near the outer edge of the car floor as illustrated.

On the other hand, if the floor 24b of the freight car is lower than the top of the platform, as shown in Fig. 6, the plate may be adjusted in the other direction as shown in said figure. It will be seen that there is sufficient play between the supporting bars 17 and the channel guides 16 to permit this adjustment of the plate and supporting bars so that the plate may be positioned between the loading platform and freight car regardless of whether the car floor is higher or lower than the top of the platform.

When the plate is not in use the free end thereof may be pried up to disengage the sharpened studs 23 from the car floor and by inserting the hooks or the like into the handles 22 the plate may be slid over the top of the loading platform until the free edge thereof is clear of the side of the freight car when the plate may be lowered to the normal position as shown in Fig. 3, the channel guides 16 engaging the stop flanges 21 on the supporting bars 17 and holding the plate supported in upright position alongside of the ramp where it is out of the way of persons walking upon the platform.

I claim:

1. A wheeling plate adapted to bridge a gap between a loading platform and a freight car, including a substantially horizontal rod located along one side of the platform, supporting bars pivotally mounted upon said rod, and a plate mounted for adjustment longitudinally of said supporting bars.

2. A wheeling plate adapted to bridge a gap between a loading platform and a freight car, including a substantially horizontal rod located along one side of the platform, supporting bars pivotally mounted for adjustment longitudinally of said rod, and a plate mounted for adjustment longitudinally of said supporting bars.

3. A wheeling plate adapted to bridge a gap between a loading platform and a freight car, including a substantially horizontal rod located along one side of the platform, supporting bars pivotally mounted upon said rod, and a plate having channel guides through which said supporting bars are slidably mounted.

4. A wheeling plate adapted to bridge a gap between a loading platform and a freight car, including a substantially horizontal rod located along one side of the platform, supporting bars pivotally mounted for adjustment longitudinally of said rod, and a plate having channel guides through which said supporting bars are slidably mounted.

5. A wheeling plate adapted to bridge a gap between a loading platform and a freight car, including a substantially horizontal rod located along one side of the platform, supporting bars pivotally mounted upon said rod, a plate having channel guides through which said supporting bars are slidably mounted, and angular stops upon the ends of said supporting bars for contact with said channel guides.

6. A wheeling plate adapted to bridge a gap between a loading platform and a freight car, including a substantially horizontal rod located along one side of the platform, supporting bars pivotally mounted for adjustment longitudinally of said rod, a plate having channel guides through which said supporting bars are slidably mounted, and angular stops upon the ends of said supporting bars for contact with said channel guides.

RICHARD R. COLGATE.